(12) United States Patent
Leiber et al.

(10) Patent No.: US 11,718,280 B2
(45) Date of Patent: Aug. 8, 2023

(54) ACTUATING APPARATUS FOR A MOTOR VEHICLE BRAKE

(71) Applicant: IPGATE AG, Pfäffikon SZ (CH)

(72) Inventors: Heinz Leiber, Oberriexingen (DE); Thomas Leiber, Rogoznica (HR); Rainer Winzer, Munich (DE)

(73) Assignee: IPGATE AG, Pfaffikon (CH)

( * ) Notice: Subject to any disclaimer, the term of this patent is extended or adjusted under 35 U.S.C. 154(b) by 0 days.

(21) Appl. No.: 16/849,092

(22) Filed: Apr. 15, 2020

(65) Prior Publication Data
US 2020/0247376 A1 Aug. 6, 2020

Related U.S. Application Data

(62) Division of application No. 15/559,767, filed as application No. PCT/EP2016/055471 on Mar. 14, 2016, now abandoned.

(30) Foreign Application Priority Data

Mar. 20, 2015 (DE) .................... 10 2015 104 246.0

(51) Int. Cl.
*B60T 8/34* (2006.01)
*B60T 8/36* (2006.01)
(Continued)

(52) U.S. Cl.
CPC .............. *B60T 8/368* (2013.01); *B60T 7/042* (2013.01); *B60T 13/145* (2013.01); *B60T 13/686* (2013.01); *B60T 13/745* (2013.01)

(58) Field of Classification Search
CPC ........ B60T 7/042; B60T 8/368; B60T 13/145; B60T 13/745; B60T 2220/04
See application file for complete search history.

(56) References Cited

U.S. PATENT DOCUMENTS 5,107,388 A * 4/1992 Murata et al. ......... G01R 33/07
361/56
6,215,299 B1 4/2001 Reynolds et al.
(Continued)

FOREIGN PATENT DOCUMENTS

DE 102011017436 A1 * 10/2012 ............ B60T 8/3675
DE 102011017436 A1 10/2012
(Continued)

OTHER PUBLICATIONS

Machine translation of DE 102011017436 (no date).*
(Continued)

*Primary Examiner* — Nicholas J Lane
(74) *Attorney, Agent, or Firm* — Panitch Schwarze Belisario & Nadel LLP (57) ABSTRACT

An actuating device for a motor vehicle brake may include an actuating device/brake pedal, a pressure supply device driven by an electric motor, a (master) piston-cylinder unit that may be actuated by the actuating device, and which is connected hydraulically with a fluid reservoir, a valve assembly for wheel-specifically adjusting brake pressures and for connecting or disconnecting the wheel brakes to/from the pressure supply device and the piston-cylinder unit, an electronic control unit, and one or more sensor devices that may be used to provide sense various conditions and to provide inputs to the electronic control unit.

11 Claims, 6 Drawing Sheets

(51) Int. Cl.
*B60T 7/04* (2006.01)
*B60T 13/14* (2006.01)
*B60T 13/68* (2006.01)
*B60T 13/74* (2006.01)

(56) References Cited

U.S. PATENT DOCUMENTS

| | | |
|---|---|---|
| 9,446,753 B2 | 9/2016 | Feigel et al. |
| 2006/0208726 A1* | 9/2006 | Mock et al. .......... G01D 5/2452 |
| | | 324/207.24 |
| 2009/0128135 A1* | 5/2009 | Masham et al. ....... G01R 33/06 |
| | | 324/205 |
| 2011/0115282 A1 | 5/2011 | Dinkel et al. |
| 2011/0260718 A1 | 10/2011 | Hirning |
| 2013/0298550 A1* | 11/2013 | Leiber ................... B60T 13/686 |
| | | 60/545 |
| 2014/0216866 A1 | 8/2014 | Feigel et al. |
| 2015/0158466 A1 | 6/2015 | Nakamura et al. |
| 2016/0016567 A1 | 1/2016 | Jurgens |
| 2016/0185330 A1 | 6/2016 | Lee et al. |
| 2019/0100172 A1* | 4/2019 | Lee ...................... F16H 25/2015 |
| 2019/0100173 A1* | 4/2019 | Hong ...................... B60T 7/042 |
| 2020/0114894 A1* | 4/2020 | Leiber ..................... B60T 17/04 |

FOREIGN PATENT DOCUMENTS

| | | |
|---|---|---|
| DE | 102011101655 A1 | 11/2012 |
| DE | 102011050869 A1 | 12/2012 |
| DE | 102012213216 A1 | 2/2013 |
| DE | 102013202350 A1 | 8/2014 |
| DE | 102014218034 A1 | 4/2015 |
| DE | 102014109628 A1 | 1/2016 |
| DE | 102014214095 A1 | 1/2016 |
| DE | 102014117726 A1 | 6/2016 |
| DE | 102015104246 A1 | 9/2016 |
| WO | 0247947 A1 | 6/2002 |

OTHER PUBLICATIONS

Int'l Search Report dated Jun. 3, 2016 in Int'l Application No. PCT/EP2016/055470.
Written Opinion dated Jun. 3, 2016 in Int'l Application No. PCT/EP2016/055470.
Int'l Search Report dated May 20, 2016 in Int'l Application No. PCT/EP2016/055471.
Written Opinion dated May 20, 2016 in Int'l Application No. PCT/EP2016/055471.
Int'l Preliminary Report on Patentability dated Sep. 26, 2017 in Int'l Application No. PCT/EP2016/055471.
Int'l Preliminary Report on Patentability dated Sep. 26, 2017 in Int'l Application No. PCT/EP2016/055470.

* cited by examiner

ACTUATING APPARATUS FOR A MOTOR VEHICLE BRAKE

CROSS-REFERENCE TO RELATED APPLICATIONS

This application is a divisional application of U.S. patent application Ser. No. 15/559,767, filed on Sep. 19, 2017 as a Section 371 of International Application No. PCT/EP2016/055471, filed Mar. 14, 2016, which was published in the German language on Sep. 29, 2016 under International Publication No. WO 2016/150746 A1, which claims priority under 35 U.S.C. § 119(b) to German Patent Application No. 10 2015 104 246.0, filed Mar. 20, 2015, the disclosures of which are incorporated herein by reference in their entireties.

The present invention relates to an actuating apparatus for a motor vehicle brake.

BACKGROUND OF THE INVENTION

Prior Art

In view of the many new systems being introduced by automotive manufacturers (OEMs), the installation of assemblies, in particular in the engine compartment, increasingly presents problems due to the limited installation spaces. In some cases for example, the ABS/ESP unit is arranged behind the engine, above all in front-wheel drives and transverse engines. The consequence is that when replacing the ABS/ESP unit the engine is in the way and may possibly need to be removed.

There is therefore a desire among OEMs to reduce the size of existing systems or to develop new systems that are as integrated and compact as possible in order for example to circumvent the problems outlined above. In addition, there are right-hand and left-hand drives, and the brake system package or combination of elements of a brake system (consisting of vacuum pump, braking force booster and ABS/ESP assembly) should preferably remain the same despite differences in their arrangement.

The current trend is to change the spatial distribution of the brake system combination over to compact and integrated "1-box solutions". In this case, all the necessary components such as pressure supply, hydraulic (valve) unit (HCU), control unit (ECU) and main cylinder are combined in a single structural unit. Such a compact "1-box brake system" is for example described in DE 10 2012 213 216.

In functional terms, a part of the "1-box brake system" replaces the vacuum booster and the vacuum pump with an electric motor. This provides a freely adjustable braking force boosting that can be modulated by means of pedal travel. This measurement of the travel of the brake pedal is effected through a pedal interface. The hydraulic supply of the "1-box brake system" with brake fluid is provided, as usual, via a reservoir that in most cases measures the fluid level using a float. Expediently, in order to increase the compactness of the brake system, the reservoir is also integrated into the brake system.

In order to fulfil the functions of an integrated brake system (1-box brake system) described above, as a rule five functionally essential sensor types are required:
  Rotation angle sensor(s), used for commutation of the motor and to determine the position of the piston (a possible measuring device is shown in the patent DE 10 2011 017 436; gear drive for the target magnet used for angle measurement).
  Preferably two pedal travel sensors that are able to perform a force measurement and register piston seizure and sensor failure (a corresponding example is disclosed in the patent DE 10 2011 050 869 A1).
  Pressure sensor(s) that measures the main cylinder pressure
  A filling level sensor for the integrated brake fluid reservoir.
  Optionally, an electrode can be provided that detects a leak in a small collecting container positioned in a suitable location, for example underneath the system Currently, there are different approaches to the arrangement of the individual sensors and system components:
  In DE 10 2014 214095, the rotatable spindle used to drive the piston is greatly lengthened in order to determine the position of the motor. A target magnet is connected with the spindle that can be sensed by a sensor on the system printed circuit board. Similar solutions are known in actuators, for example in DE 10 2014 218034, in which the sensors used to control the motor are mounted on the system printed circuit board.
  In the brake system shown in DE 10 2012 213 216, a first cylinder-piston arrangement actuated by the vehicle's driver is described. The pressure-generating device and the valve block are also arranged in the same housing. The axis of the electric motor of the pressure-generating device is arranged substantially perpendicular to the longitudinal axis of the first cylinder-piston arrangement. This solution is intended to achieve a certain degree of compactness, which can however be further improved (width, length). In particular, the adaptability to different installation situations leaves something to be desired, for example installation in the engine compartment (so-called "front bolted" installation).

BRIEF SUMMARY OF THE INVENTION

The object of the invention is to create the most compact brake actuation system possible, which, in particular, also offers a great deal of latitude in constructive design with regard to the sensor devices and can thus also be used flexibly in different vehicles or installation situations.

Solution of the Problem

This problem is solved according to the invention in that at least one sensor or evaluation element of the sensor device is arranged in the electronic control unit (ECU), in particular on a system printed circuit board (PCB) of the control unit, or is connected with this, and that a movement of the device components is transmitted to the electronic control unit (ECU) via a sensor actuating device, in particular via a mechanical sensor target or via a sensor target connected with the device components and magnetic flux-conducting components based on ferromagnetic materials.

In other words, a transmission of movements or sensor signals by means of a mechanical transmission device to a sensor target takes place (as already disclosed, in principle, in the priority application DE 10 2015 104246.0, the content of which is incorporated in full herein) or by means of a magnetic device, wherein in particular flux-conducting components are used in proximity to sensor or evaluation elements on a system printed circuit board (PCB) of the control unit (ECU).

With the solution according to the invention, a brake actuation system is created that, with respect to the sensor devices, enables a flexible, compact arrangement that is favourable in terms of weight and costs, and is moreover adaptable, allowing different flexible layout possibilities in terms of the arrangement of the main components (HCU, ECU, motor, pedal interface, main brake cylinder, pressure supply), taking into consideration the installation conditions, and that enables an economical and fail-safe solution without using cables/plugs. In particular, the limiting condition that not all sensors may be arranged in direct proximity to the ECU is to be taken into consideration. This relates, in particular, to the most important sensors (pedal stroke sensor, motor angle sensor).

According to an advantageous embodiment of the invention, the sensor or evaluation elements of at least one sensor device, in particular the sensor or evaluation elements of a pedal movement sensor, of a motor movement or rotation angle sensor and of a piston movement sensor or also other sensors, or all sensor devices, are arranged on a system printed circuit board (PCB) arranged in the electronic control unit (ECU), and the actuation targets (for example permanent magnets) are arranged in proximity to the evaluation element, or the magnetic signal is carried via flux-conducting components into proximity with the PCB.

In particular, a mechanical transmission of the sensor signals can expediently be made to a target in proximity to the evaluation element in the ECU or the system printed circuit board (PCB), or using flux-conducting components as a transmission medium.

Expediently, a sensor for determining the movement travel of a piston of the piston-cylinder unit or of a brake pedal (BP) connected thereto can be provided, wherein the actuation of the sensor target takes place by means of the mechanical actuating mechanism, in particular by means of a linkage and gear arrangement.

According to a further advantageous embodiment, a sensor for determining the movement travel of a piston of the piston-cylinder unit or of a brake pedal (BP) connected thereto is provided, wherein at least one sensor target is arranged on the piston and the transmission to the electronic control unit (ECU) is effected by means of flux-conducting components.

In particular, a sensor for determining the motor or rotor movement can be provided, wherein the actuation of the sensor target takes place by means of the mechanical actuating mechanism, in particular by means of a linkage and gear arrangement.

According to a further variant, the gearing is arranged in a separate housing on or in the motor and a frictional coupling with the target drive is provided.

According to another advantageous embodiment, a sensor for determining the motor or rotor movement is provided, wherein at least one sensor target is arranged on the rotor or on an element connected thereto, in particular a pole disc, and the transmission to the electronic control unit (ECU) is effected by means of flux-conducting components.

Expediently, a sensor for determining the movement of a level sensor is provided, in particular in a float of a reservoir (VB), wherein a sensor target is arranged on a moveable part of the level sensor, in particular on the float, and the transmission from the sensor target to the electronic control unit is effected by means of flux-conducting components.

In particular, the sensor elements of at least one sensor, in particular all sensors, can be arranged on a system printed circuit board (PCB) located in the electronic control unit (ECU).

The distance of the sensor target or the flux-conducting components from the sensor or evaluation element is short, in particular less than 5 mm.

According to an advantageous embodiment, at least one of the sensors or one of the evaluation elements is a Hall element, wherein in particular its external and protective circuitry is arranged on the system printed circuit board (PCB).

In an advantageous embodiment, the actuating device has at least a first (GH1) and a second (GH2) housing unit, wherein in particular the first housing unit (GH1) accommodates all pistons of the piston-cylinder unit (main cylinder) and the pressure supply unit and the second housing unit (HCU)(GH2) accommodates the valve assembly. In particular, at least one sensor actuating device can be partially arranged in the first (GH1) or/and second housing unit (GH2) and/or the motor housing, or can be passed through this.

With the invention, or its advantageous variants and embodiments, a 1-box solution is created that fulfils the following requirements and has the following advantages:
  small installation space and installation length
  largely symmetrical design suitable for left-hand drives (LL) and right-hand drives (RL)
  good accessibility of the hydraulic and electrical connections for installation
  mounting on the front wall (bulkhead) of the vehicle possible from the engine ("front bolted") as well as from the footwell
  lowest possible costs and weight
  modular design for different expansion stages, for example autonomous driving
  high fail-safety
  low failure rate According to the invention or its advantageous variants and embodiments, the following measures are also provided (wherein in particular a structure with at least two housings is proposed):
  a first housing (GH1), which accommodates all system-relevant pistons (THZ, pistons for the pressure supply and pump), has a mounting flange for the bulkhead and possesses a pedal interface with pedal sensor actuation.
  a second housing (GH2; HCU, Hydraulic Control Unit), with solenoid valves, non-return valves, orifices and pressure sensors, which for attachment purposes are caulked or press-fitted with a suitable deformable material, for example aluminum.
  both housings can also be extended or combined into one housing.
  the electrical control unit ECU is mounted directly on the HCU, as is nowadays usual worldwide.
  the low costs, low failure rates and interference immunity can be achieved in that the sensor evaluation element (Hall sensor) is mounted directly on the system printed circuit board and the target is located in close proximity.

There is no need for an additional printed circuit board with plug connection. Interference affecting the connection cables does not therefore occur. The whole sensor with target can be realised most simply if the target, with corresponding actuation, is mounted directly on the sensor element. This can be realised with an actuation via a gear drive, both for pedal travel as well as for the motor. This is more difficult in the case of a motor that is arranged at a distance from the system printed circuit board. A good solution in terms of handling during the manufacture of the motor and overall installation is to have the gear wheels mounted independently in the motor. For the operation of the sensors, during final testing of the motor a shaft is coupled with the gear wheel by means of a frictional connection. When assembled, the shaft, with the target, is fixed in the housing unit the during overall installation. All parameters such as frictional connection, mechanical resistances and signals can be checked.

If the pedal travel sensors are also designed with a gear drive (analogously to the measuring principle used for the motor position), then the mechanical drive can be of single or redundant design. If a redundant drive is used, it is expedient to use an electrical element (E-KWS) that also allows a blocking of the drive to be detected.

If a gear drive is not desired in pedal travel sensors, the target magnet can for example be mounted in the piston. The change in flux over the direction of the piston on actuation of the pedal can for example be transmitted via flux-conducting components to a Hall sensor.

This principle can also be applied to the level sensor for the brake fluid reservoir, with "only" a threshold value being detected in this case. Again, flux-conducting components can be helpful here, since they allow the sensor element not to positioned in proximity to the target magnet. Alternatively, an optical method could also be used here.

A 1D Hall sensor with only two connections can be used to detect the position of a piston or level sensor. As already mentioned, in this case the sensor element would be mounted directly on the system printed circuit board or connected by means of a plug.

The motor is mounted underneath the GH1 at the greatest possible distance from the bulkhead of the vehicle. It is desirable here to create plenty of space for the hydraulic and electrical connecting lines. If necessary, it can in addition be installed inclined forwards at an angle.

The motor is connected in the GH1 with a pump, ideally with a reciprocating pump or double-acting reciprocating pump.

A reservoir is mounted on the system at the side and is connected with the suction intake of the pump.

The sensor actuators are accommodated in or passed through the GH1 or the GH2 and transmit the movement of the pedal and of the rotor to a rotatable target magnet. The evaluation element (for example rotation angle sensor (Hall sensor)) is mounted directly on the system printed circuit board or is connected therewith. This means that no additional cables and/or printed circuit boards (PCBs) are necessary in order to accommodate, for example, the Hall element.

At least one sensor element is connected with the system printed circuit board that measures the fluid level in the reservoir.

An electrical connecting element (plug) connected to the vehicle's electrical system is attached from the side or from the front to an attachment of the control unit (ECU). This is advantageous, since it creates additional installation volume in the assembly space. The latter requires a short construction length of GH1 and GH2. Alternatively, the control unit can be arranged at the side or at the front.

The hydraulic connecting lines to the wheel brakes are attached to the front in order to simplify accessibility for left-hand and right-hand drives.

Any leakage through seals can be collected by means of a motor housing that is extended in its lower part and is sensed by means of an electrode.

Further embodiments or variants of the invention and their advantages are contained in further claims, to which reference is made here.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 5A-1 and 5A-2 show examples of piston travel measurement;

DETAILED DESCRIPTION OF THE INVENTION

Figure 1:
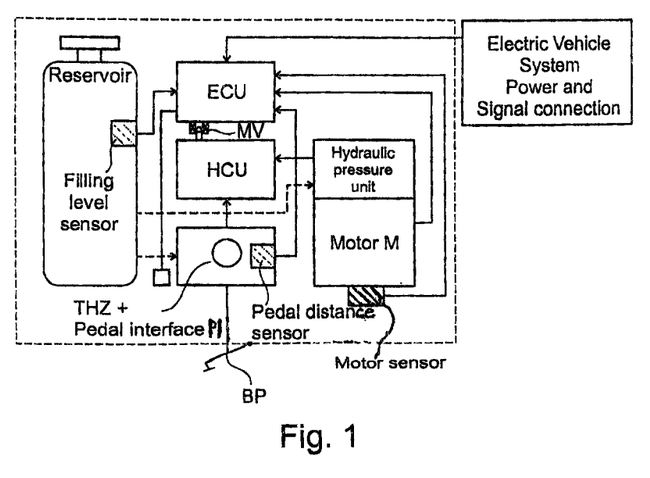
FIG. 1 shows a schematic representation of an actuating device for a brake system for a motor vehicle.

FIG. 1 shows the structuring and interaction of the individual components of a 1-box brake system. The essential components consist of:

brake pedal (BP)
pedal interface (PI) with tandem main cylinder (THZ)
motor (M) with pressure piston
hydraulic block (HCU or GH2)
control unit (ECU)
plug (connection to vehicle's electrical system for supply and communication)
reservoir or compensating tank The interaction with the driver takes place starting from the brake pedal, which acts on the TMC piston via the pedal interface. At all times, the pedal travel is measured by means of two sensors housed in the system for this purpose. The displaced volume from the TMC piston passes on into the hydraulic unit (HCU), which contains solenoid valves (MV) and a pressure sensor. All valves and the pressure sensor as well as all sensor connections are connected with the electrical control unit and combined and enclosed in the housing of the electrical control unit. The connected sensors in the ECU include a motor position sensor, two pedal travel sensors, a pressure sensor, a filling level sensor and, optionally, an electrode for leakage flow detection, with a correspondingly small container, which is for example integrated in the HCU or ECU housing. The housing is fixed to the hydraulic unit (HCU) by means of screws. A sealing ring between the two components (HCU and ECU) prevents the penetration of various foreign bodies. The energy supply and the external communication with other control devices is effected via a plug on the brake system. The system also has a pressure supply, which is driven by an electric motor. This pressure supply can take different forms, which are for example described in DE 10 2014 117 726. In order to supply the whole brake system with the necessary brake fluid, a reservoir or supply container is situated on the system.

Figure 2:
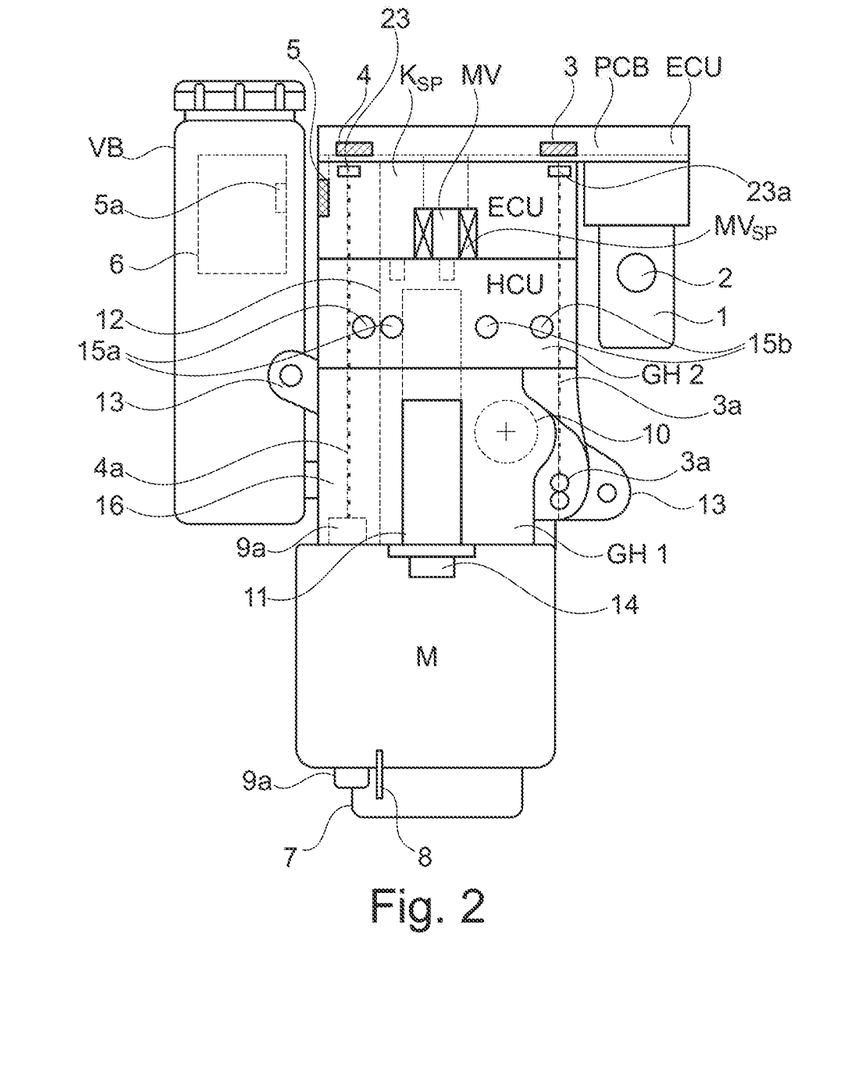
FIG. 2 shows a view of the brake system from the front, with the subdivision and structure of the main components.

FIG. 2 shows one mechanical structure from the brake system described with reference to FIG. 1, starting from the front in the direction of the bulkhead of a vehicle. Beginning from the bottom, the motor (M) is attached to the housing HU1 by means of the mounting 14. The motor drives a pump 11 connected via suction valves 16 with the reservoir (VB). Possible pump designs are described in the patent specifications DE 10 2014 109 628 and DE 10 2014 117 726. The housing GH1, in which moveable pistons are mounted, is integrated on a mounting flange 13 attached to the bulkhead and is accessible from the engine compartment, which makes possible a so-called "front-bolted" installation. For this purpose, a corresponding recess for the fastening tool needs to be provided on the side of the reservoir or supply container (VB).

Figure 3:
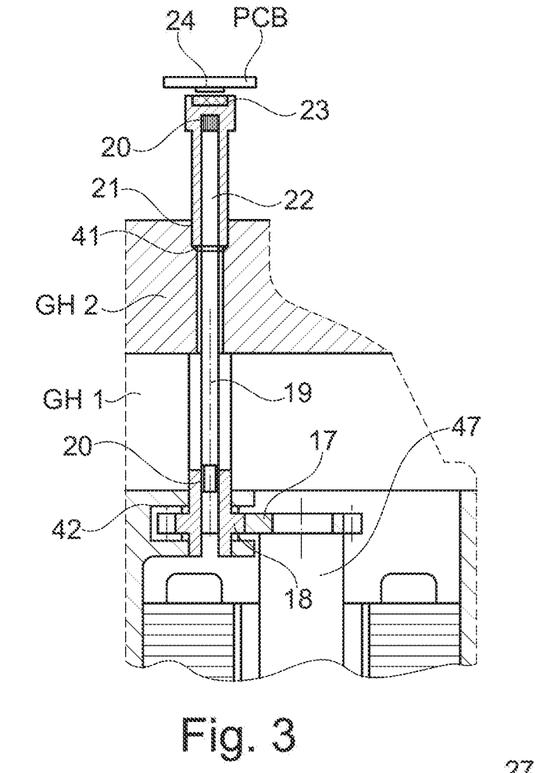
FIG. 3 shows a motor sensor drive.
Figure 4A:
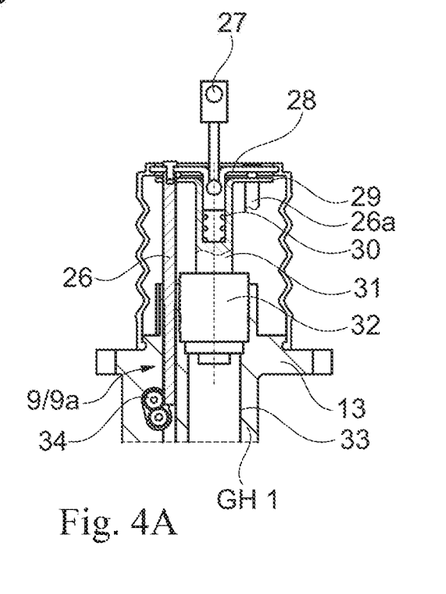
FIG. 4A shows a first part of a pedal travel sensor drive (connecting element to the actuating pedal)

The drive of a sensor target is mounted in the housing GH2; these are illustrated in detail in FIGS. 3 and 4A. The motor rotation angle target can be installed in front of (9a) or behind (9b) the motor and can measure the angular position of the motor. As already described with reference to FIG. 1, the control unit (ECU) is mounted, in a sealed manner, on the housing HU2 with solenoid coils and contacts for all sensors, valves and motor.

To the side or also to the front there is a connecting element 1 (main plug) with the wiring harness 2 leading to the vehicle's electrical system. Attached on the underside of the motor housing is a housing extension in which the aforementioned electrode for leakage detection is housed. A possible leakage flow is for example conducted from the piston into a bowl on the spindle and downwards through a spindle bore. If the direction of the pedal interface is considered as the axis of rotation, the system can be installed in the vehicle rotated by +/−90°. Naturally, the position of the brake pedal remains the same; however, the aforementioned collecting container must be rearranged accordingly. Possible positions would be next to the GH1 or even in the ECU.

Alternatively to the embodiment shown, other conceivable variants of 1-box brake systems exist (for example as described in DE102012213216A1). In this embodiment too, due to the limiting conditions for installation, the motor and pedal stroke or piston travel is arranged in immediate proximity to the PCB of the ECU and a plurality of sensors is to be connected with the ECU. In other words, also in this approach, and in alternative approaches to packaging solutions, the flexible connection of sensor signals via mechanical transmission members or flux-conducting components according to the invention is advantageous and avoids complicated contacting, reduces costs and increases reliability.

FIG. 3 shows the drive of a motor rotation angle sensor illustrated in FIG. 2. The drive gear wheel 17 is mounted on the shaft in front of or behind the motor. This gear wheel 17 is bevel geared to reduce noise and engages with a drive gear wheel 18, which is pressed onto an anti-rotation lock 20. The shaft is preferably mounted in the housing HU2 in a bearing bush 21. The flexural elasticity provided by the extensive length from the bearing 21 to the gearing 20a is used to ensure that the gear wheel 17 runs without play. On the shaft end nearest the sensor there is a target magnet 23 with a receptacle made of plastic 22, which forms an opposing storage in the housing GH2. The magnet is sensed by means of a sensor element 24 (for example a Hall sensor) on the system printed circuit board 25.

A gear wheel housing is fixed inside the motor housing that contains the bearings of the drive gear wheel on both sides. The knurled shaft is adequately secured against rotation in the resilient flange of the gear wheel 18, which substantially only needs to withstand the slight bearing friction and moment of inertia during acceleration of the motor. The motor with gear drive can thus also be tested during the final testing of the motor, by plugging a shaft into the measuring device. During the final installation of the assemblies, the shaft 19 with its bearings is fixed in the GH2 and the sensor tested in the assembled state.

FIG. 4A shows the actuation of the pedal travel sensors. For safety reasons, two pedal travel sensors are used that are used for pedal force measurement via a spring element—see also the applicant's DE 10 2011 101 655, which will be further addressed and referred to here. Thus, a pedal tappet 27 with a pedal plate 28 is coupled with a piston 31, which acts on a spring element 30. This acts on the piston 31 in order to generate pressure in the main cylinder (THZ) in the pressure chamber 33. In this connection, see the applicant's patent DE 10 2014 117 726, to which reference is made in this respect. This piston 31 is connected with a piston plate 29. In order to actuate the sensor the pedal plate 28 is connected with a first gear rack 26 and a piston plate 29 is connected with a second gear rack 26a. The two gear racks 26, 26a drive a gear wheel each, 24, 34a, as shown in FIG. 4a. The first housing GH1 is fixed in the front wall region with the mounting flange 13.

Figure 4B:
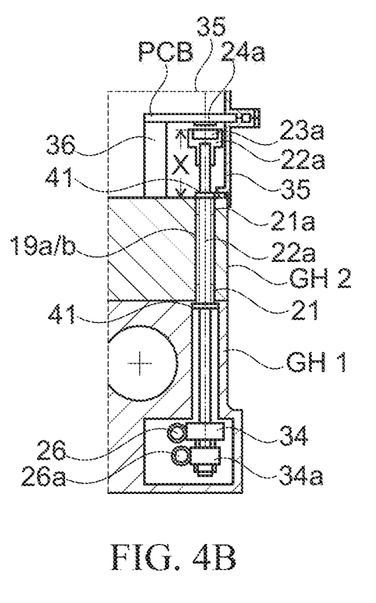
FIG. 4B shows a second part of a pedal travel sensor drive (connecting element to the target)

FIG. 4B shows a sensor drive for both pedal travel sensors. Gear racks 26 and 26a act on different levels on gear wheels 34 and 34a. The connection to the sensor target very largely corresponds to the motor sensor shown in FIG. 3. Here too, flexurally elastic shafts 19a, 19b are used that are mounted in bearing bushes 21 and 21a and fixed together with the sensor target 22a and with the target 23a (magnet) so as to prevent rotation. The target 23a acts on a sensor element 24a, which is fixed, together with the other sensor elements, on the common system printed circuit board (PCB) 25 in an electrically conductive manner. In line with the proven prior art, the housing 35 of the control unit ECU contains the system printed circuit board (PCB) 25 with all components and the solenoid coils shown in FIG. 2. Due to heat dissipation, the system printed circuit board (PCB) 25 is mounted on an aluminum plate, since the MOSFETs used for the motor control in particular generate heat loss. This can be transferred simply through the aluminum plate, via a thermally conductive strip, to the second housing.

Figure 5A:
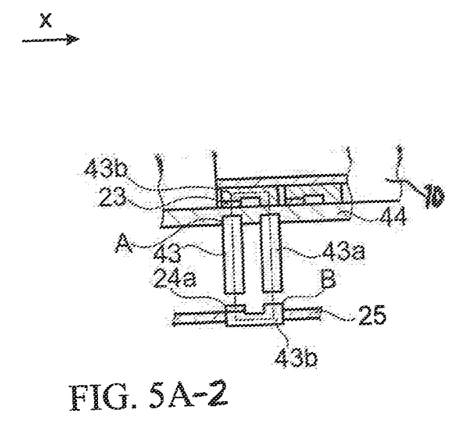
Figure 5A:
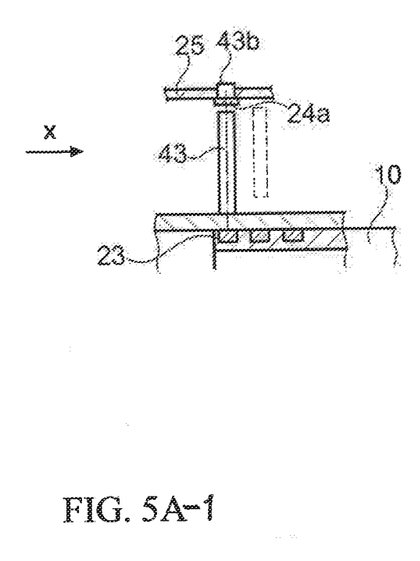

FIGS. 5A-1 and 5A-2 show examples of an arrangement for measuring a movement of a piston 10, which can also be connected with a brake pedal (BP) and thus also measures the pedal travel. The magnetic flux of a target magnet is passed to the sensor via flux-conducting components 43 or 43b by means of a sensor element 24a, which is mounted on the system printed circuit board 25. The magnets are magnetised differently depending on the arrangement of the magnetic circuit with flux-conducting components. FIGS. 5A-1 and 5A-2 show two different possible arrangements or embodiments. FIG. 5A-1 is based on the change in flux of several magnets 23 of differing polarity and can be measured by means of the sensor element 24a. In contrast, the arrangement shown in FIG. 5A-2 and its travel measurement only require one target magnet; however, the magnetic flux must be conducted through the flux-conducting components in a different way. The back iron 43 and the flux-conducting component 43a are configured such that with the movement of the magnet in the direction of measurement a N/S polarity can be detected. Depending on the arrangement, the air gap, magnets and flux-conducting components must be designed accordingly in order to guarantee a suitable measurement. Ultimately, the linearisation and the signal processing of the travel measurement can take place either in the sensor elements or in the ECU. In connection with FIG. 5A, FIG. 5D shows a view of the embodiment shown in FIG. 5A-2, in the direction indicated by arrow X. The piston 10, flux-conducting components 43, permanent magnets 23 and sensor element 24a are shown in the illustration.

In terms of construction design, different options exist for minimising the air gap, for example in FIG. 5A-2, gluing or caulking in a recess of the housing 44. The flux-conducting components can be manufactured economically as stamped, pressed or moulded parts. Depending on the requirements in terms of travel and accuracy, different sensor targets can be connected in succession. The signal waveform of the sensor element, for example sinusoidal, is prior art and is not shown separately.

Figure 5B:
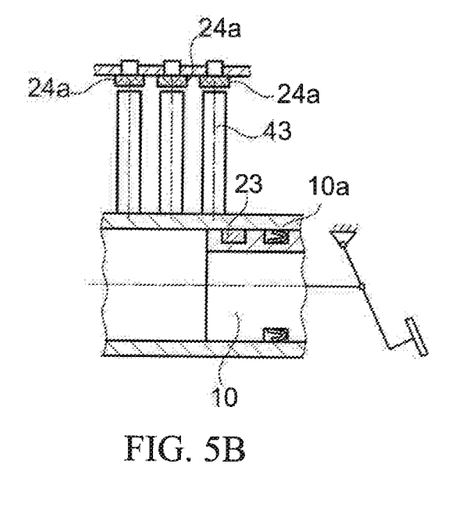
FIG. 5B shows a piston travel measurement with a magnet target in the piston and several flux-conducting components/sensor evaluation elements.

FIG. 5B shows, in a simplified manner, an alternative for the arrangement of the sensor target 23 and sensor element 24a with flux-conducting components, in that only a single target in the piston 10 with seal 10a activates different sensor elements 24a. The magnetic circuit is described in above.

Figure 5C:
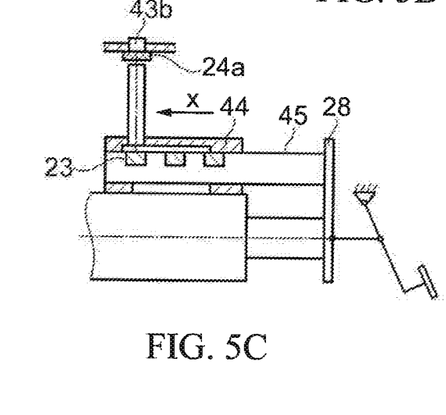
FIG. 5C shows a further piston travel measurement with flux-conducting components.
Figure 5D:
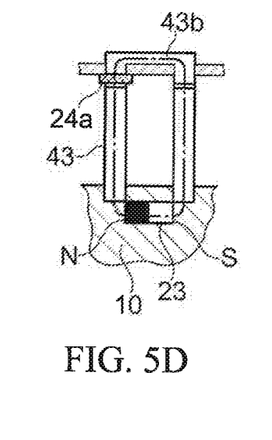
FIG. 5D shows a further view of a piston travel measurement according to aspects of this disclosure.

FIG. 5C shows an arrangement for pedal travel measurement in which the sensor target 23 is mounted on a separate rod 45 or slider in the housing 44 and is connected with the pedal plate 28. The magnetic circuit is shown in the illustration and, with the target magnet 23, which is connected with the rod or bar 45, has a N-S polarity. The flux is passed via the flux-conducting components 43 and 43b to the sensor element 24a. This arrangement allows constructively optimised housing within the overall packaging of the system independently of the main cylinder piston.

Figure 6:
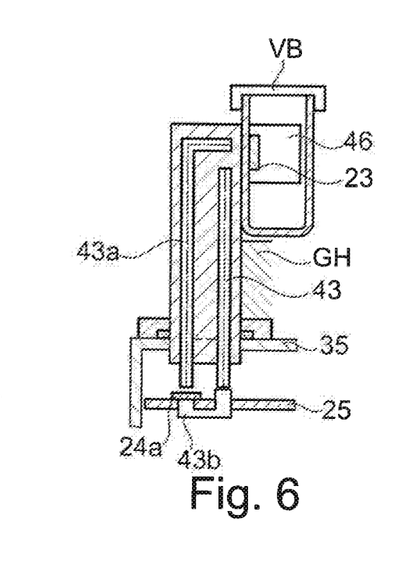
FIG. 6 shows the position of the level sensor with flux-conducting components.

FIG. 6 illustrates the principle of using flux-conducting components to measure the filling level of the brake fluid reservoir VB. For this purpose, the sensor target is mounted in the float 46, and the magnetic flux is passed via the flux-conducting components 43, 43a, 43b to the sensor element 24a, which is in turn mounted on the system printed circuit board (PCB) 25. In this case the flux-conducting components are injection-moulded into a housing connected with and fixed to the housing unit GH1 or GH2. The sealing of the ECU housing is provided by the seal S.

Figure 7A:
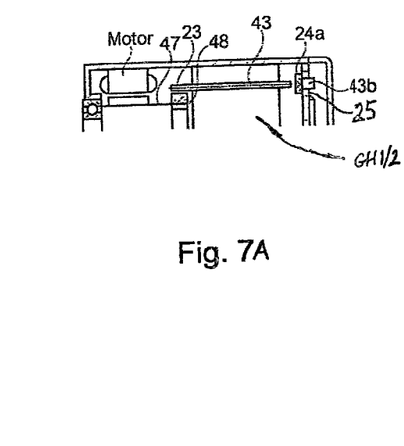
FIGS. 7A and 7B show examples of motor sensors with segment sensor and flux-conducting components.
Figure 7B:
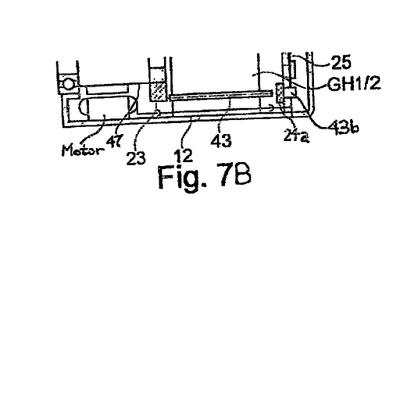

FIGS. 7A and 7B illustrate the principle of using flux-conducting components to measure the motor position, as an alternative to FIG. 3. The arrangement has a known magnet ring 48 composed of segment magnets on the motor, which is connected with the rotor 47. The magnet ring is sensed with a sensor element 24a and depending on the number of magnet ring segments can measure a certain rotor angle in absolute terms. This application is widely used, this structure having been modified with flux-conducting components. The magnet ring can have a radial arrangement of the poles, as shown in FIG. 7A, or an axial arrangement of the poles, as shown in FIG. 7B. Here, too, the magnetic flux is conducted from the target 23 via flux-conducting components 43, 43a, 43b to the sensor element 24a on the system PCB 25 in the ECU housing. The magnetic circuit can correspond to FIG. 5C, in which the flux-conducting components are arranged in a segment and are mounted in the housing unit 1 or 2. The motor is connected electrically with the system printed circuit board (PCB) 25 via electrical connecting elements 12.

This sensor concept, in which the sensor element of preferably all the sensors is mounted on the system printed circuit board (PCB) 25, represents an economical solution with a great deal of latitude in terms of constructive design.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SIGNS 1 connecting element (main plug)
2 wiring harness
3 sensor element for pedal travel
3a actuation target for pedal travel sensor
4 sensor element for motor rotation
4a actuation target for motor travel sensor
5 sensor element for filling level
5a target for filling level sensor
6 float in the reservoir
7 extended motor housing or leak collector
8 electrode
9 drive for target actuation of motor encoder in front of the motor rotor
9a drive for target actuation of motor encoder behind the motor rotor
10 TMC piston
10a piston seal
11 pump or pump piston
12 electrical connecting element to motor with several cables
13 flange for mounting on front wall
14 motor mounting
15 hydraulic connection to wheel brake
16 connection to pump suction valve
17 drive gear wheel
18 output gear wheel
19 shaft 1
19a/b shaft 2 and 3
20 anti-rotation lock (knurl)
21 bearing bush
21a bearing bush
22 target holder
22a target holder
23 target (magnet)
23a target (magnet)
24 sensor element
24a sensor element
25 system printed circuit board PCB
26 gear rack 1
26a gear rack 2
27 pedal tappet
28 pedal plate
29 piston plate
30 spring for force-displacement measurement
31 piston
32 sealing and bearing bush
33 pressure chamber for piston
34 gear wheel 1
34a gear wheel 2
35 ECU housing
36 thermally conductive strip
37 E/E construction units
38 assemblies, for example air conditioning
39 front wall
40 cable compartment 41 limit stop ring
42 gear wheel housing
43 flux-conducting components
43a back iron flux-conducting component a
43b ditto b
44 housing
45 rod/slider
46 float
47 rotor
48 magnet ring
GH1 first housing unit
GH2 second housing unit
VB brake fluid reservoir
PI pedal interface
MV solenoid valves
LL left-hand drive
RL right-hand drive
PCB circuit board
$K_{SP}$ magnet coil connection
D seal

What is claimed is:

1. An actuating apparatus for a motor vehicle brake, comprising:
 a brake pedal,
 a pressure supply device, driven by an electric motor drive,
 a piston-cylinder unit, comprising a main cylinder and a piston, wherein the piston is movable within the main cylinder in a longitudinal direction, wherein the piston-cylinder unit is enabled to be actuated using the brake pedal, wherein the brake pedal is connected to the piston of the piston-cylinder unit,
 a valve assembly including valves arranged to adjust brake pressures in a wheel-specific manner and to disconnect or connect the wheel brakes from or to the pressure supply device and the piston-cylinder unit,
 an electronic control unit,
 one or more sensor devices, respectively having one or more sensors or evaluation elements and a sensor target, configured to sense movement of one or more components of the actuating apparatus, wherein at least one of the one or more sensors or evaluation elements of the one or more sensor devices is disposed in the electronic control unit, on a system printed circuit board of the electronic control unit, and wherein the respective sensor targets of the one or more sensor devices are disposed inside or outside of the electronic control unit, wherein the respective sensor targets are mechanically and/or magnetically coupled with the at least one of the one or more sensors or evaluation elements disposed in the electronic control unit,
 wherein movement of the brake pedal is mechanically transmitted to the electronic control unit via a first sensor actuating device including a first gear rack coupled to the brake pedal, wherein at least one first sensor target of the one or more sensor targets is actuated via a first gear wheel configured to convert translational motion of the first gear rack into rotational motion of at least one first shaft carrying the at least one first sensor target,
 wherein movement of the piston is mechanically transmitted to the electronic control unit via a second sensor actuating device including a second gear rack coupled to the piston, wherein at least one second sensor target of the one or more sensor targets is actuated via a second gear wheel configured to convert translational motion of the second gear rack into rotational motion of at least one second shaft carrying the at least one second sensor target,
 wherein the first and second gear racks extend parallel to the longitudinal direction of the piston-cylinder unit,
 wherein the at least one first shaft and the at least one second shaft are disposed in a direction perpendicular to the longitudinal direction of the piston-cylinder unit, and
 wherein the at least one first shaft and the at least one second shaft are mounted in bearing bushes.

2. The actuating apparatus according to claim 1, further comprising:
 a pedal plate actuated by the brake pedal and connected to the first gear rack; and
 a piston plate substantially parallel to the pedal plate and connected to the piston of the piston-cylinder unit,
 wherein the pedal plate and the piston plate are elastically connected to each other.

3. The actuating apparatus according to claim 1, wherein the respective gear wheels and the respective sensor targets are disposed at opposite ends of the respective shafts.

4. The actuating apparatus according to claim 3, further comprising at least a first housing unit that accommodates all pistons of the piston-cylinder unit and the pressure supply unit, wherein the respective shafts extend through the first housing such that the respective gear wheels are located inside of the first housing unit and the targets outside of the first housing unit.

5. The actuating apparatus according to claim 1, wherein at least one of the one or more sensor targets is realized as a N/S permanent magnet.

6. The actuating apparatus according to claim 1, wherein the at least one first shaft and the at least one second shaft comprise two shafts fixed together with the at least one first and at least one second sensor targets.

7. The actuating apparatus according to claim 1, wherein a distance of a sensor target from a respective sensor or evaluation element is less than 5 mm.

8. The actuating apparatus according to claim 1, wherein at least one of the one or more sensor or evaluation elements is a Hall element, wherein external and protective circuitry of the Hall element is arranged on the system printed circuit board.

9. The actuating apparatus according to claim 1, wherein the at least one first shaft or the at least one second shaft is an elastic shaft.

10. The actuating apparatus according to claim 1, further comprising at least a first housing unit and a second housing unit, wherein the first housing unit accommodates all pistons of the piston-cylinder unit and the pressure supply unit, and wherein the second housing unit accommodates the valve assembly.

11. The actuating apparatus according to claim 10, wherein the control unit is arranged in a third housing unit that is mounted directly on the second housing unit and is connected with the second housing unit.

\* \* \* \* \*